(12) United States Patent
Sakai

(10) Patent No.: US 11,849,097 B2
(45) Date of Patent: Dec. 19, 2023

(54) STORAGE MEDIUM, INFORMATION PROCESSING APPARATUS, AND METHOD FOR COMPRESSING IMAGE PRINTING DATA THAT INCLUDES VALUES CORRESPONDING TO SPECIAL INK PRINTING

(71) Applicant: CANON KABUSHIKI KAISHA, Tokyo (JP)

(72) Inventor: Hiroyuki Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/867,561

(22) Filed: Jul. 18, 2022

(65) Prior Publication Data
US 2023/0031924 A1 Feb. 2, 2023

(30) Foreign Application Priority Data
Jul. 29, 2021 (JP) .................. 2021-124182

(51) Int. Cl.
*H04N 1/64* (2006.01)
*G06K 15/02* (2006.01)

(52) U.S. Cl.
CPC ......... *H04N 1/648* (2013.01); *G06K 15/1807* (2013.01)

(58) Field of Classification Search
CPC ...................................... H04N 1/648

USPC ......................................... 358/539
See application file for complete search history.

(56) References Cited

U.S. PATENT DOCUMENTS

2009/0190848 A1* 7/2009 Watanabe ............ H04N 19/146
358/1.16
2014/0293301 A1* 10/2014 Yamada ................ G06F 3/1285
358/1.9

FOREIGN PATENT DOCUMENTS

JP 2006-350660 A 12/2006

* cited by examiner

*Primary Examiner* — Jacky X Zheng
(74) *Attorney, Agent, or Firm* — Canon U.S.A., Inc. IP Division

(57) ABSTRACT

A method comprises acquiring print setting information related to printing of image data, and, in a case where the print setting information specifies printing using at least special ink, which is ink other than ink for a process color, during printing of the image data, determining a first method as a method of processing for reducing a data size of the image data and, in a case where the print setting information specifies printing using ink for the process color without using the special ink during printing of the image data, determining a second method different from the first method as a method of processing for reducing the data size of the image data.

22 Claims, 10 Drawing Sheets

FIG.4

| USE OF SPECIAL INK | FILE FORMAT | COMPRESSION QUALITY Q VALUE |
|---|---|---|
| USE | JPEG | 100 |
| DO NOT USE | JPEG | 70 |

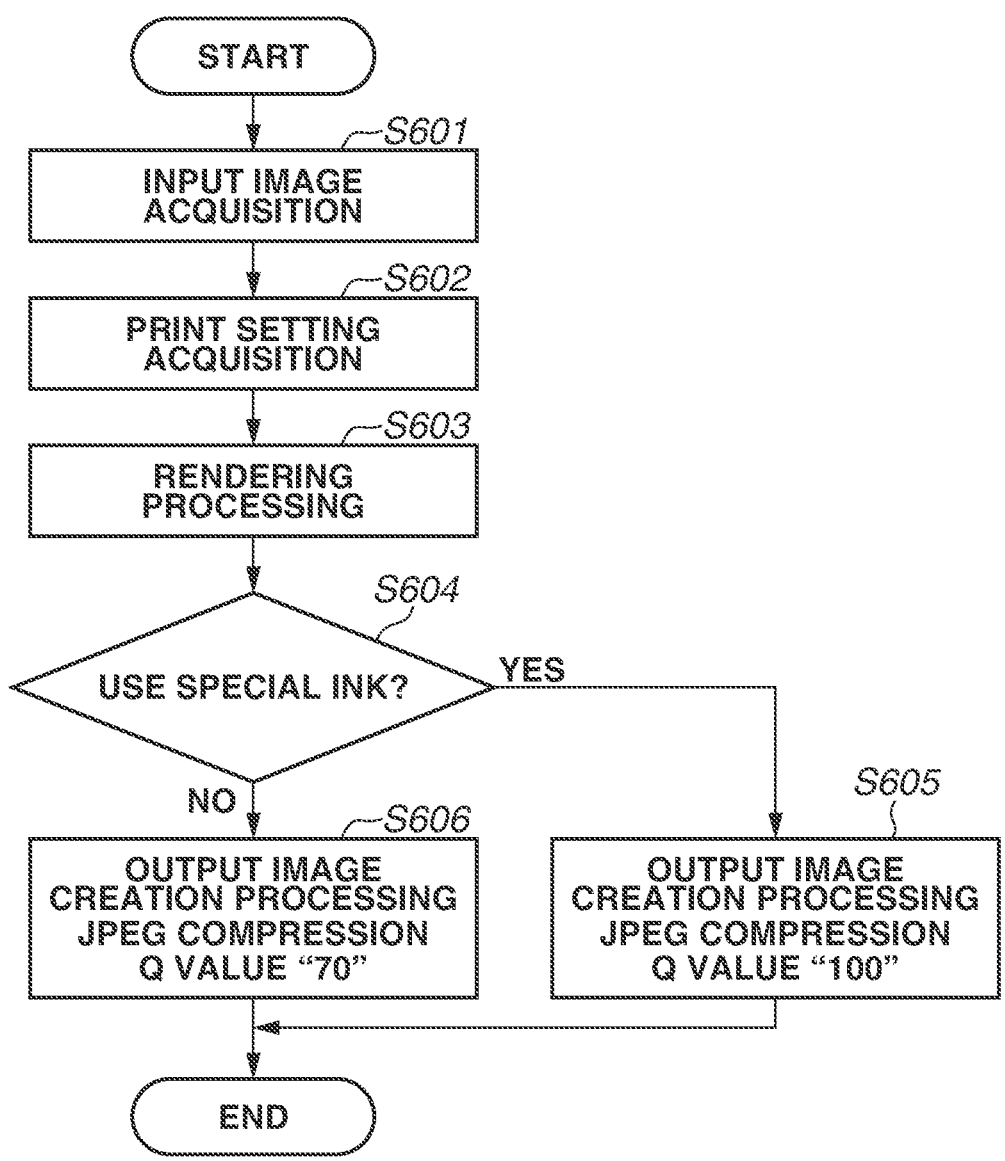

FIG.7

| OS | USE OF SPECIAL INK | FILE FORMAT | Q VALUE |
|---|---|---|---|
| MOBILE TERMINAL | USE | JPEG | 100 |
| MOBILE TERMINAL | DO NOT USE | JPEG | 70 |
| PC TERMINAL | USE | PNG | NONE |
| PC TERMINAL | DO NOT USE | JPEG | 70 |

STORAGE MEDIUM, INFORMATION PROCESSING APPARATUS, AND METHOD FOR COMPRESSING IMAGE PRINTING DATA THAT INCLUDES VALUES CORRESPONDING TO SPECIAL INK PRINTING

BACKGROUND

Field of the Disclosure

Aspects of the present disclosure generally relate to a storage medium, an information processing apparatus, and a control method.

Description of the Related Art

There is known a method of, before transmitting image data to a printing apparatus (printer), reducing the data size of image data in such a way as not to exceed a buffer (memory) limit of the printer and then transmitting the image data with the data size thereof reduced to the printer, thus printing an image. For example, Japanese Patent Application Laid-Open No. 2006-350660 discusses a technique of, in a case where image data has a data size exceeding a memory limit of the printer, compressing and converting the image data into file format (hereinafter referred to as "conversion into image file format") in such a way as to making the data size of image data smaller than the memory limit of the printer.

However, for example, the technique discussed in Japanese Patent Application Laid-Open No. 2006-350660 does not take into consideration switching processing parameters related to image data based on a property of the image data. As a result, a printed product which the user intends to obtain may not be able to be obtained.

SUMMARY

According to an aspect of the present disclosure, a method comprises acquiring print setting information related to printing of image data, and, in a case where the print setting information specifies printing using at least special ink, which is ink other than ink for a process color, during printing of the image data, determining a first method as a method of processing for reducing a data size of the image data and, in a case where the print setting information specifies printing using ink for the process color without using the special ink during printing of the image data, determining a second method different from the first method as a method of processing for reducing the data size of the image data.

Further features of various embodiments will become apparent from the following description of exemplary embodiments with reference to the attached drawings.

BRIEF DESCRIPTION OF THE DRAWINGS

FIG. 4 is a diagram illustrating a table representing compression parameters corresponding to the presence and absence of use of special ink in performing conversion into image file format.

FIG. 5 is a flowchart illustrating processing for determining a compression parameter corresponding to the presence or absence of use of special ink and performing compression processing using the determined compression parameter in performing conversion into image file format.

FIG. 7 is a diagram illustrating a table representing compression formats and compression parameters corresponding to types of terminals and the presence and absence of use of special ink in performing conversion into image file format.

DESCRIPTION OF THE EMBODIMENTS

Various exemplary embodiments, features, and aspects of the present disclosure will be described in detail below with reference to the drawings. Furthermore, the following exemplary embodiments should not be construed to limit the claims, and not all of the combinations of features described in the exemplary embodiments are necessarily essential for solutions in the present disclosure. Moreover, in the accompanying drawings, the same or similar constituent elements are assigned the respective same reference numbers, and any duplicate description thereof is omitted.

Figure 1:
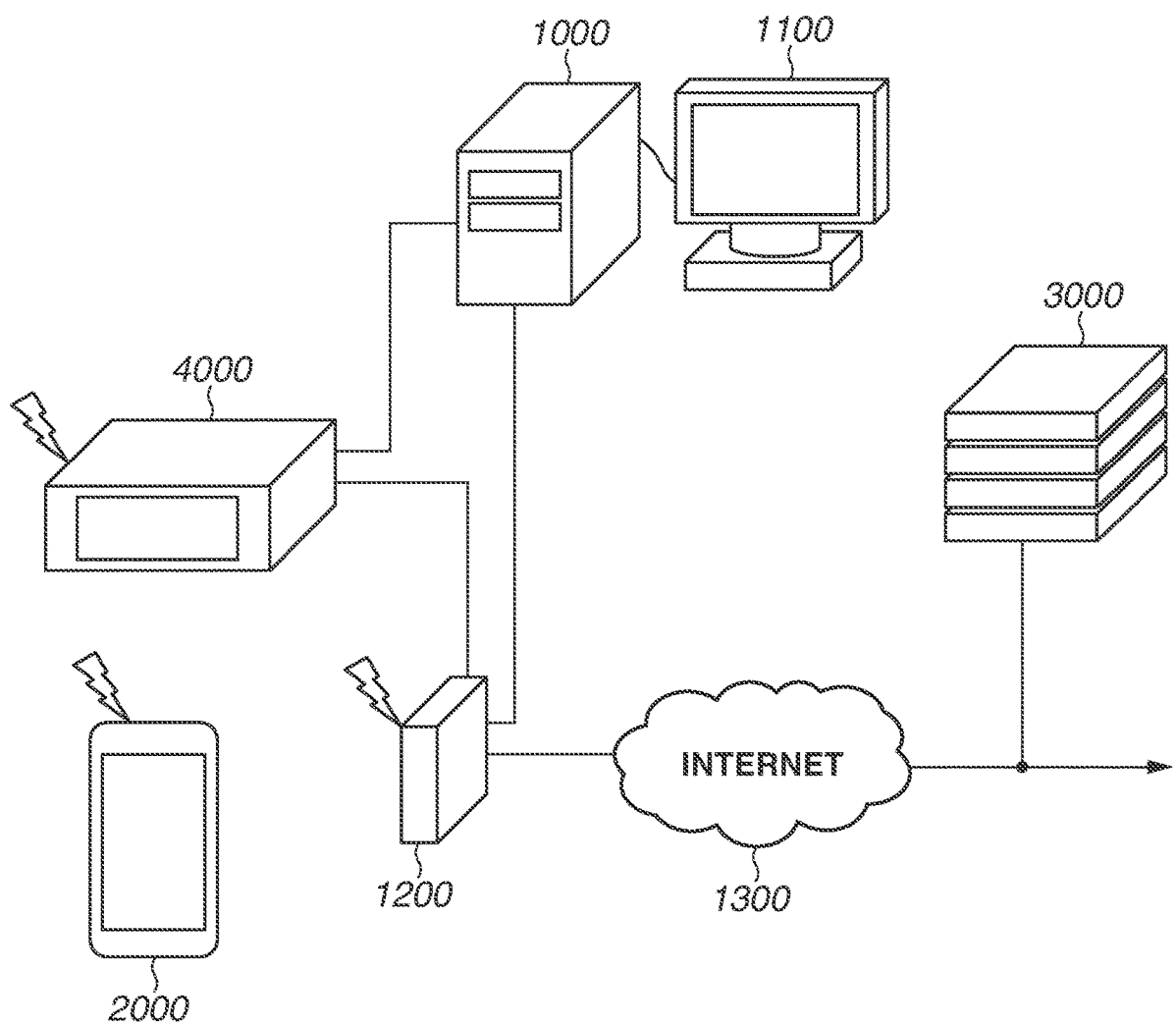
FIG. 1 is a diagram illustrating a configuration of a system.

FIG. 1 is a diagram illustrating a configuration of a system in a first exemplary embodiment. The system configuration in the first exemplary embodiment includes a client computer 1000, a display 1100, a router 1200, a mobile terminal 2000, a server computer 3000, and a printing apparatus (hereinafter referred to as a "printer") 4000.

The client computer 1000 is connected to the router 1200 via wired communication or wireless communication and is connected via the router 1200 to another communication apparatus capable of performing communication via the Internet 1300.

The display 1100 is connected to, for example, the client computer 1000 by a communication cable and displays data (information) stored in the client computer 1000 on a screen of the display 1100. Furthermore, the client computer 1000 and the display 1100 can be an integrated apparatus.

The mobile terminal 2000 is connected to the router 1200 via wireless communication and is capable of communicating with another communication apparatus via the router 1200 and the Internet 1300.

The server computer 3000 is capable of communicating with another communication apparatus via the Internet 1300. Then, the server computer 3000 receives data which is retained in the client computer 1000 or the mobile terminal 2000, stores the received data in a memory (e.g., an external storage device 304 described below with reference to FIG. 2), and performs data processing or data transmission to another apparatus. Furthermore, a function which is implemented by the server computer 3000 can be implemented by a single information processing apparatus or can be implemented by a plurality of information processing apparatuses cooperating with each other.

The printer 4000 is connected to the router 1200 via wired communication or wireless communication and is connected via the router 1200 and the Internet 1300 to another communication apparatus. Moreover, the printer 4000 receives data stored in the client computer 1000, the mobile terminal 2000, or the server computer 3000 and performs printing on a print medium based on the received data.

Furthermore, a communication method which is used for connection between apparatuses is, for example, a communication standard in the IEEE 802.11 series (Wi-Fi) or Bluetooth® (e.g., Bluetooth Classic or Bluetooth Low Energy (BLE)). Moreover, the communication method can be a wired connection, such as Universal Serial Bus (USB), IEEE 1394, or a local area network (LAN). Additionally, respective apparatuses can be configured to perform communication by mobile telecommunications (3G, 4G, or 5G).

The client computer 1000 is, for example, a personal computer (PC). Moreover, the mobile terminal 2000 is, for example, a tablet computer or a smartphone. Moreover, a printing method for the printer 4000 which is used in the first exemplary embodiment can be an electrophotography method or an inkjet method or can be any other method. Moreover, in the first exemplary embodiment, the printer 4000 is capable of performing spot color printing. The spot color printing is printing using special ink (spot color ink) other than normal ink. Then, the "normal ink" is ink which is used to perform printing with a process color, and is ink for colors, such as cyan (C), magenta (M), yellow (Y), and black (K), which form the basis of the process color. Furthermore, the process color is a color expressed by a single color out of C, M, Y, and K or a combination of two or more colors out of C, M, Y, and K. Moreover, in the first exemplary embodiment, ink for fluorescent pink or ink for fluorescent orange is used as the special ink. A spot color expressed by the special ink is a color different from the process color and is a color which is unable to be repressed by only a single color out of C, M, Y, and K or a combination of two or more colors out of C, M, Y, and K. However, the first exemplary embodiment is not limited to this configuration, so that the number of special inks or a color of special ink can be an optional one or ink for a color other than fluorescent color can be used. For example, ink for violet, ink for green, ink for orange, ink for gold, or ink for silver can be used as the special ink. Moreover, ink for other metallic color can be used. Additionally, ink obtained by mixing special ink and other ink (e.g., normal ink) can be treated as the special ink.

Figure 2:
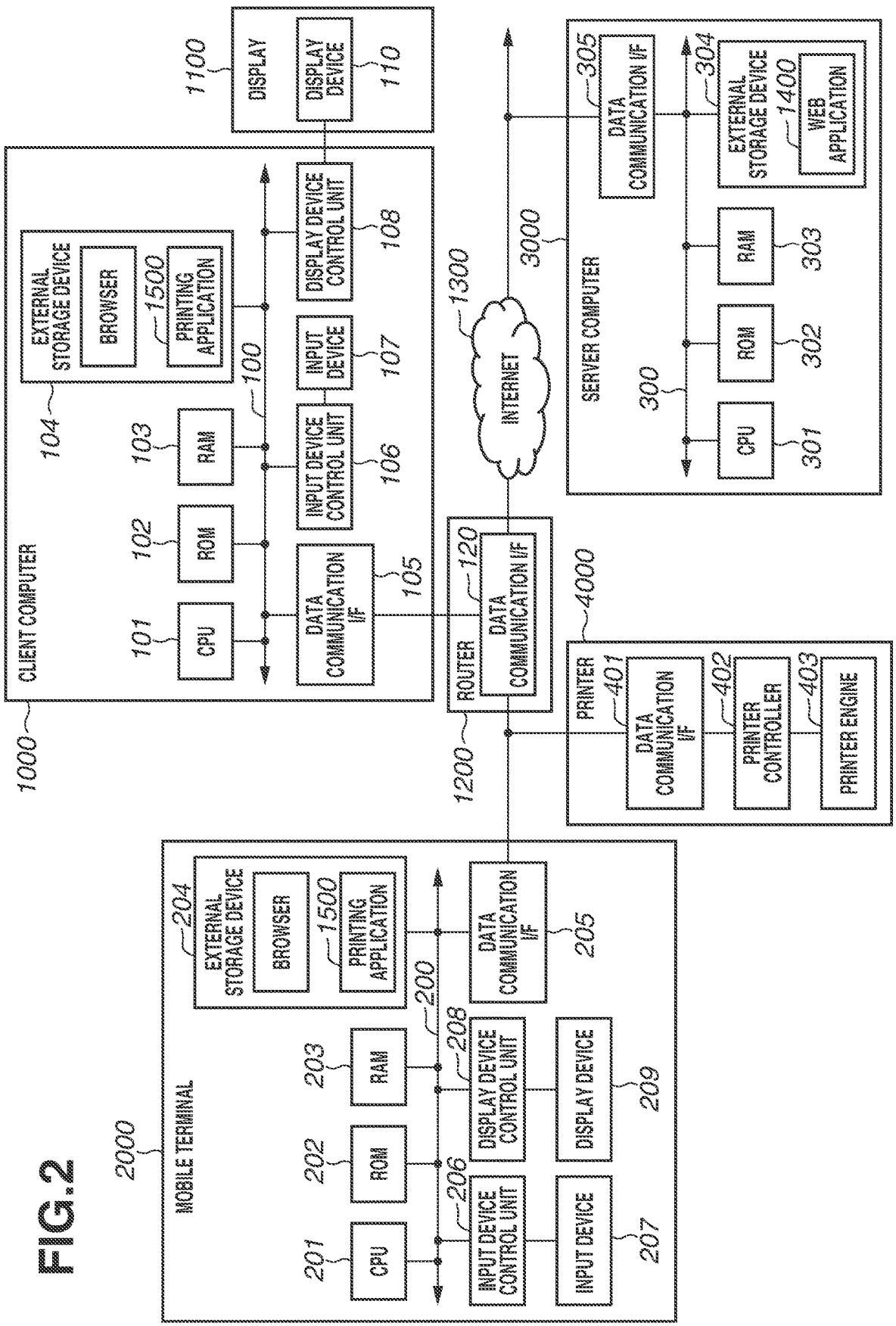
FIG. 2 is a diagram illustrating a hardware configuration of the system.

FIG. 2 is a diagram illustrating a hardware configuration of the system in the first exemplary embodiment.

The client computer 1000 includes a central processing unit (CPU) 101, a read-only memory (ROM) 102, a random access memory (RAM) 103, an external storage device 104, a data communication interface (I/F) 105, an input device control unit 106, an input device 107, and a display device control unit 108.

The CPU 101, which is a central arithmetic device, performs processing according to designated programs. For example, the CPU 101 receives programs and data stored in the ROM 102, the RAM 103, and the external storage device 104 and performs arithmetic processing.

The ROM 102, which is a non-volatile storage, is capable of retaining table data and programs which are used for processing in each exemplary embodiment described below.

The RAM 103, which is a volatile storage, temporarily retains programs and data.

The external storage device 104, which is a non-volatile storage, retains programs and data. For example, the external storage device 104 retains, for example, a browser and a printing application 1500.

The data communication I/F 105 controls transmission and reception of data between the client computer 1000 and the server computer 3000 or the printer 4000 via the router 1200. Furthermore, the data communication I/F 105 can be configured to control transmission and reception of data between the client computer 1000 and the mobile terminal 2000.

The input device control unit 106 is an I/F which acquires information about an operation performed by the user and transmits control information to each processing unit.

The input device 107 is a human interface device (HID), such as a keyboard and a mouse. The user is able to perform an input operation via the input device 107.

The display device control unit 108 is an I/F which transmits, to the display device 1100, drawing data stored in the ROM 102, the RAM 103, or the external storage device 104.

The display 1100 includes a display device 110. The display device 110 displays, on a screen thereof, drawing data received from the display device control unit 108 of the client computer 1000.

The router 1200 includes a data communication I/F 120, and, in the data communication I/F 120, controls transmission and reception of data between the client computer 1000, the mobile terminal 2000, and the printer 4000.

The mobile terminal 2000 includes a CPU 201, a ROM 202, a RAM 203, an external storage device 204, a data communication I/F 205, an input device control unit 206, an input device 207, a display device control unit 208, and a display device 209.

The CPU 201, the ROM 202, the RAM 203, the external storage device 204, and the input device control unit 206 have respective configurations similar to those of the CPU 101, the ROM 102, the RAM 103, the external storage device 104, and the input device control unit 106.

The data communication I/F 205 controls transmission and reception of data between the mobile terminal 2000 and the printer 4000. The mobile terminal 2000 can be configured to perform transmission and reception of data between the mobile terminal 2000 and the printer 4000 using, for example, Wi-Fi DIRECT® without communicating via the router 1200. Furthermore, the data communication I/F 205 can be configured to control transmission and reception of data between the mobile terminal 2000 and the client computer 1000 or the server computer 3000.

The input device 207 is a device similar to the input device 107 and is also a device which has display and input functions which are included in a tablet computer or a smartphone and is capable of allowing the user to perform an operation on a screen thereof. For example, the input device 207 is a device equipped with a unit such as a touch panel.

The display device control unit 208 is an I/F which transmits drawing data stored in the ROM 202, the RAM 203, or the external storage device 204 to the display device 209.

The display device 209 displays drawing data received from the display device control unit 208. In most cases, the display device 209 is built in the mobile terminal 2000.

The server computer 3000 includes a CPU 301, a ROM 302, a RAM 303, an external storage device 304, and a data communication I/F 305.

The CPU 301, the ROM 302, and the RAM 303 have respective configurations similar to those of the CPU 101, the ROM 102, and the RAM 103.

The external storage device 304, which is a non-volatile storage, retains programs and data. For example, the external storage device 304 includes, for example, a web application 1400.

The data communication I/F 305 controls transmission and reception of data between the server computer 3000 and the client computer 1000 or the printer 4000 via the router 1200. Furthermore, the data communication I/F 305 can be configured to control transmission and reception of data between the server computer 3000 and the mobile terminal 2000. The data communication I/F 305 is capable of transmitting print data. The print data includes an image file, which has been generated by performing processing for reducing the data size of image data mainly used for printing, and print setting data, which is used for issuing a print instruction. Additionally, the print setting data includes, for example, a paper size, the presence or absence of designation of duplex printing, the presence or absence of designation of borderless printing, the presence or absence of use of special ink, a special ink use strength (e.g., a proportion of special ink), and the value of a color using special ink. Furthermore, the special ink use strength means the magnitude of proportion of special ink which is used for printing of a color using special ink.

The printer 4000 includes a data communication I/F 401, a printer controller 402, and a printer engine 403.

The data communication I/F 401 controls transmission and reception of data between the printer 4000 and the client computer 1000, the mobile terminal 2000, or the server computer 3000 via the router 1200. The data communication I/F 401 receives print data generated by any one of the client computer 1000, the mobile terminal 2000, and the server computer 3000. The print data includes an image file, which has been generated by performing processing for reducing the data size of image data mainly used for printing, and print setting data (information), which is used for issuing a print instruction. Additionally, the print setting data includes, for example, a paper size, the presence or absence of designation of duplex printing, the presence or absence of designation of borderless printing, the presence or absence of use of special ink, a special ink use strength (e.g., the amount of special ink), and the value of a color using special ink.

The printer controller 402 performs control of the printer engine 403 according to instruction data included in the received print data. Moreover, the printer controller 402 converts image data by using, for example, color space conversion or color separation to color materials required for printing according to the type of paper included in print setting data. Additionally, the printer controller 402 converts image data into printable recording data by using image processing parameters such as a look-up table for image processing including output gradation correction or halftoning. Furthermore, the printer controller 402 is configured with, for example, a CPU, a ROM, and a RAM, which have configurations similar to those of the CPU 101, the ROM 102, and the RAM 103.

The printer engine 403 converts image data included in the received print data into respective pieces of ink color data and performs print processing. The print processing includes causing a print head to eject ink by controlling a heating operation and a pressure operation on a heater mounted in the print head based on the recording data.

Here, the conversion into image file format is described. The conversion into image file format is a technique to compress and reduce the data size of image data in such a way as not to exceed a receiving memory amount of the printer. For example, if image data with a data size exceeding the limit of the receiving memory amount of the printer is transmitted to the printer, an error may occur or a processing time for printing may increase. Therefore, it is necessary to perform conversion into an image file format on image data, thus reducing the data size of the image data to be transmitted to the printer.

Moreover, the printer specifies which ink to use in printing of each pixel based on red, green, and blue (RGB) values set for each pixel of the received image data. Then, in the first exemplary embodiment, in a case where RGB values in a specific range set for special ink are set to a pixel, the printer specifies using special ink for printing of the pixel. Moreover, in a case where RGB values outside the specific range are set to a pixel, the printer specifies not using special ink but using normal ink for printing of the pixel. Then, when image data is subjected to conversion into image file format, in a case where the image data has been compressed in such a way as to further reduce the data size of the image data, RGB values which are values of colors previously set for the image data may be changed to a large extent. Particularly, in a case where image data is printed with use of special ink, to cause image data to be printed with use of special ink, specific RGB values corresponding to special ink printing are previously edited with respect to image data. However, if RGB values are changed to a large extent due to the image data being compressed, the changed RGB values may become RGB values that do not correspond to special ink printing or may become RGB values corresponding to other special ink different from the special ink designated by the user. As a result, appropriate printing using special ink for image data may not be performed.

Therefore, the first exemplary embodiment is configured to change a compression method (a compression format or compression parameter) in performing conversion into an image file format depending on the presence or absence of the use of special ink for image data. This enables appropriately printing image data using special ink.

Figure 3:
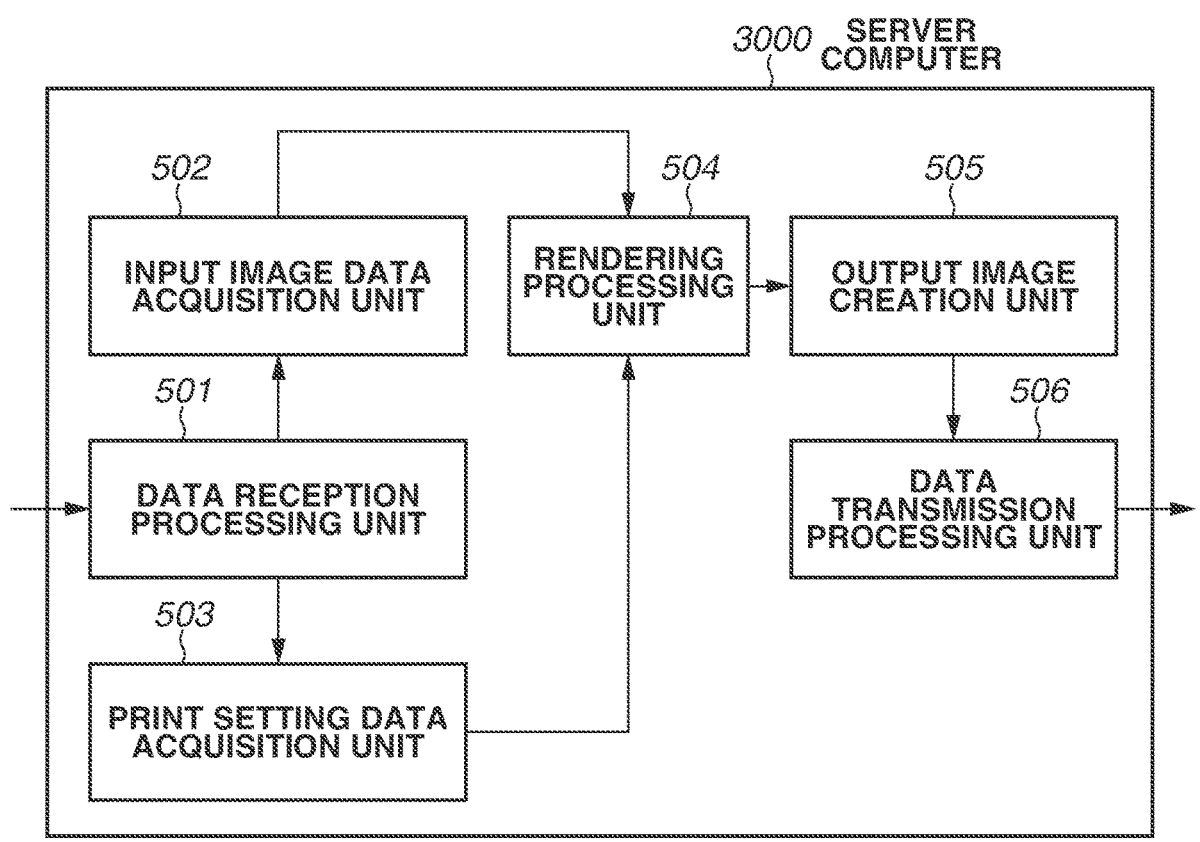
FIG. 3 is a diagram illustrating a software configuration of the system.

FIG. 3 is a diagram illustrating a software configuration of the system. FIG. 3 illustrates a configuration of software of the server computer 3000 as an example. Referring to FIG. 3, each processing unit is described mainly with regard to rendering processing for generating printing image data.

The server computer 3000 includes a data reception processing unit 501, an input image data acquisition unit 502, a print setting data acquisition unit 503, a rendering processing unit 504, an output image creation unit 505, and a data transmission processing unit 506.

The data reception processing unit 501 is a processing unit in which the CPU 301 receives data related to generation of image data from the client computer 1000 or the mobile terminal 2000 via communication I/Fs of the respective terminals. The data related to generation of image data includes, for example, input image data, print setting data, and information about a printer serving as a transmission destination. Furthermore, in the data reception processing unit 501, the CPU 301 stores the received data related to creation (generation) of image data in the external storage device 304 or the RAM 303.

The input image data acquisition unit 502 is a processing unit in which the CPU 301 acquires input image data (hereinafter referred to as "input image data D1") included in the data received by the data reception processing unit 501. For example, in the input image data acquisition unit 502, the CPU 301 acquires, as the input image data D1, image data subjected to conversion into an image file format. For example, the image data subjected to conversion into an image file format may be vector image data. Moreover, the compression format (form) in performing conversion into an image file format may be, for example, a Joint Photographic Experts Group (JPEG) format. Moreover, for example, the compression format in performing conversion into an image file format may be, for example, a Scalable Vector Graphics (SVG) format. Furthermore, the compression format in performing conversion into an image file format for the input image data D1 can be any format as long as it is a format capable of converting image data into printing image data in rendering processing described below. Moreover, the input image data D1 can be any image data as long as it is image data which is able to be converted into printing image data in rendering processing described below. Furthermore, the format of a file created with image data compressed with use of a given compression format is also referred to as a "compression format".

The print setting data acquisition unit 503 is a processing unit in which the CPU 301 acquires print setting data (hereinafter referred to as "print setting data D2") included in the data received by the data reception processing unit 501. The print setting data D2 includes, for example, printer model information, a paper feeding method, a paper size, a paper type, a print quality, and borderless printing designation information related to creation of printing image data D3 described below. Moreover, the print setting data D2 includes size information about an output image calculated from various items of the print setting.

The rendering processing unit 504 is a processing unit in which the CPU 301 creates printing image data (hereinafter referred to as "printing image data D3") from the input image data D1 using the print setting data D2. In the rendering processing unit 504, the CPU 301 acquires the input image data D1 acquired by the input image data acquisition unit 502. Moreover, the CPU 301 acquires the print setting data D2 acquired by the print setting data acquisition unit 503. Then, in the rendering processing unit 504, the CPU 301 creates the printing image data D3 from the input image data D1 using the print setting data D2.

Creation of the printing image data D3 is specifically described. In the rendering processing unit 504, the CPU 301 calculates a print area image size (hereinafter referred to as a "print area image size P1") relative to the paper from the input image data D1 and the print setting data D2. Calculation of the print (printing) area image size P1 is specifically described. For example, suppose that the sizes of width and height of the input image data D1 are 3,000 pixels and 4,000 pixels. Moreover, suppose that the print setting data D2 includes information indicating that borderless printing has been set with respect to the paper size of A4 (210 mm×297 mm) and the sizes of width and height of a printable area size (hereinafter referred to as a "printable area size P2") relative to the paper are 4,500 pixels and 6,800 pixels. Furthermore, as the sizes of width and height of the printable area size P2 that is based on the setting content, the sizes defined by information previously retained by the printer 4000 can be used or the sizes defined by information transmitted from the printer 4000 can be used. Next, the CPU 301 calculates the image size of image data subjected to at least one of enlargement and reduction processing (hereinafter referred to as "enlargement/reduction processing") in such a manner that the input image data D1 falls within the printable area size P2. Thus, the CPU 301 calculates such an image size that the input image data D1 falls within the printable area size P2 while the ratio between the width and height of input image data D1 (aspect ratio) is kept unchanged. The sizes of width and height of the input image data D1 are 3,000 pixels and 4,000 pixels and the sizes of width and height of the printable area size P2 are 4,500 pixels and 6,800 pixels. Accordingly, the image size which falls within the printable area size P2 is 4,500 pixels in size of width and 6,000 pixels in size of height.

This image size is set as the print area image size P1.

In the rendering processing unit 504, the CPU 301 creates printing image data D3 including image data obtained by performing enlargement/reduction processing of the input image data D1 into the print area image size P1.

The output image creation unit 505 is a processing unit in which the CPU 301 performs conversion into image file format (or output image creation processing) of the printing image data D3 generated by the rendering processing unit 504.

For example, in the output image creation unit 505, the CPU 301 performs conversion into image file format of the printing image data D3 by, for example, a compression format such as Joint Photographic Experts Group (JPEG) or Portable Network Graphics (PNG). The method for conversion into image file format uses a known technique. Moreover, the output image creation processing is described below with reference to FIG. 5. Furthermore, if the image data is compressed by the JPEG format, data in the JPEG format is generated, and, if the image data is compressed by the PNG format, data in the PNG format is generated.

The data transmission processing unit 506 is a processing unit in which the CPU 301 transmits an image file (output image data) created by the output image creation unit 505 to another terminal via a communication FF. Specifically, in the data transmission processing unit 506, the CPU 301 transmits print data to the client computer 1000, and the CPU 101 of the client computer 1000 transmits the print data to the printer 4000. The print data includes a created image file and print setting data used for issuing a print instruction. Additionally, the print setting data includes a paper size, the presence or absence of designation of duplex printing, the presence or absence of designation of borderless printing, the presence or absence of use of special ink, a special ink use strength (e.g., the amount of special color ink), and the value of a color using special ink. Furthermore, in the data transmission processing unit 506, the CPU 301 can be configured to directly transmit print data to the printer 4000 without via the client computer 1000.

FIG. 4 is a diagram illustrating a table showing compression forms and compression parameters corresponding to the presence and absence of use of special ink in performing conversion into image file format. Thus, the table indicates that, with respect to the printing image data D3 generated by the rendering processing unit 504, a compression parameter used for performing conversion into image file format by the output image creation unit 505 is changed depending on the presence or absence of use of special ink.

As a compression format and a compression parameter for use in performing conversion into image file format, a Q value, which is a value indicating a compression strength (compression ratio) in the JPEG format, is used. As the Q value is smaller, the compression strength is higher, so that the file size of image data can be made smaller. Moreover, as the Q value is smaller, RGB values set to input image data change to a greater extent. Thus, the data size of image data subjected to conversion into image file format with the Q value "100" becomes larger than the data size of image data subjected to conversion into image file format with the Q value "70". Moreover, the amount of change of RGB values subjected to conversion into image file format with the Q value "100" becomes smaller than the amount of change of RGB values subjected to conversion into image file format with the Q value "70". Furthermore, a different configuration can be applied to a compression format and a compression parameter.

FIG. 4 illustrates an example in which, in the case of using special ink for image data, the CPU 301 performs conversion into image file format with the Q value set to "100" and, in the case of not using special ink for image data, the CPU 301 performs conversion into image file format with the Q value set to "70". As mentioned above, as the Q value is smaller, RGB values set to input image data change to a greater extent. Therefore, in the case of using special ink for image data, for the purpose of making the amount of change of RGB values smaller, the CPU 301 sets the Q value larger than in the case of not using special ink for image data.

Furthermore, in the case of performing compression in the JPEG format on image data, it is previously supposed that, in the case of the Q value "100", even if RGB values of a color using special ink are changed, the RGB values fall within an appropriate usage range when special ink is used for image data. Thus, it is previously supposed that appropriate special ink is able to be used for image data. Moreover, in the case of performing compression in the JPEG format on image data, it is previously supposed that, in the case of the Q value "70", if RGB values of a color using special ink are changed, the RGB values do not fall within an appropriate usage range when special ink is used for image data. Thus, it is previously supposed that appropriate special ink is not able to be used for image data.

Furthermore, the Q values which are used in respective cases are not limited to the values shown in FIG. 4. The Q value which is used when special ink is used for image data can be any value as long as it is a Q value in which it is previously supposed that, even if RGB values of image data are changed, the RGB values fall within an appropriate usage range. Moreover, the Q value which is used when special ink is not used for image data can be any value as long as it is a value smaller than the Q value which is used when special ink is used for image data.

FIG. 5 is a flowchart illustrating processing in which, when performing conversion into image file format in the output image creation unit 505, the CPU 301 determines a compression format and a compression parameter depending on the presence or absence of use of special ink and performs compression. Processing in each step in the flowchart of FIG. 5 is implemented by the CPU 301 of the server computer 3000 reading out and executing a program related to the processing operations in the flowchart of FIG. 5.

Here, data related to creation of output image data which is transmitted to the server computer 3000 is described. Furthermore, the web application 1400, the printing application 1500, and the respective setting contents thereof mentioned in the following description are merely examples, and the first exemplary embodiment is not limited to these examples. Additionally, data related to creation of output image data does not necessarily need to be created by the flow explained in the following description and transmitted to the server computer 3000.

The client computer 1000 or the mobile terminal 2000 is retaining a browser and a printing application 1500, which performs print setting. First, the user starts up the browser on the screen (display 1100) of the client computer 1000 or the screen of the mobile terminal 2000, and accesses a Uniform Resource Locator (URL) of the web application 1400. This causes the web application 1400, which is used by the browser, to be transmitted to the client computer 1000 or the mobile terminal 2000. The browser uses the transmitted web application 1400 to display the screen of the web application 1400 on the browser, thus displaying a screen conforming to a user operation. Furthermore, the web application 1400 is being retained by the server computer 3000. For example, if the user inputs image data onto the web application 1400 via the screen of the web application 1400, the input image data is transmitted to the server computer 3000. Moreover, a preview image of the image data is displayed on the screen of the web application 1400. Additionally, if the user performs an editing operation with respect to the displayed preview image on the browser, a preview image in which the editing operation has been reflected is created by the server computer 3000 and is then displayed on the browser. Furthermore, the web application 1400, which is used by the browser, can be configured not to be transmitted to the client computer 1000 or the mobile terminal 2000, and the server computer 3000 can be configured to perform an action corresponding to the operation of the user. Then, the content of the action or the preview image can be displayed on the screen of the client computer 1000 or the mobile terminal 2000, and the first exemplary embodiment is not limited to those.

The user performs, for example, editing of an image or setting of an image area for which to use special ink, on the screen of the web application 1400. Furthermore, it is assumed that information related to an operation performed on the screen of the web application 1400 is transmitted to the server computer 3000 as needed. Then, if the user presses, for example, a "next" button 706 on the screen of the web application 1400, the printing application 1500 is invoked. Furthermore, information related to an operation performed on the screen of the web application 1400 can be transmitted to the printing application 1500 and then be transmitted to the server computer 3000 in response to a "print" button 707 described below being pressed.

The user sets, for example, selection of a printer, a paper type, a paper size, the presence or absence of use of special ink, and the use strength of special ink on the screen of the printing application 1500 and then presses the "print" button 707.

Figure 6A:
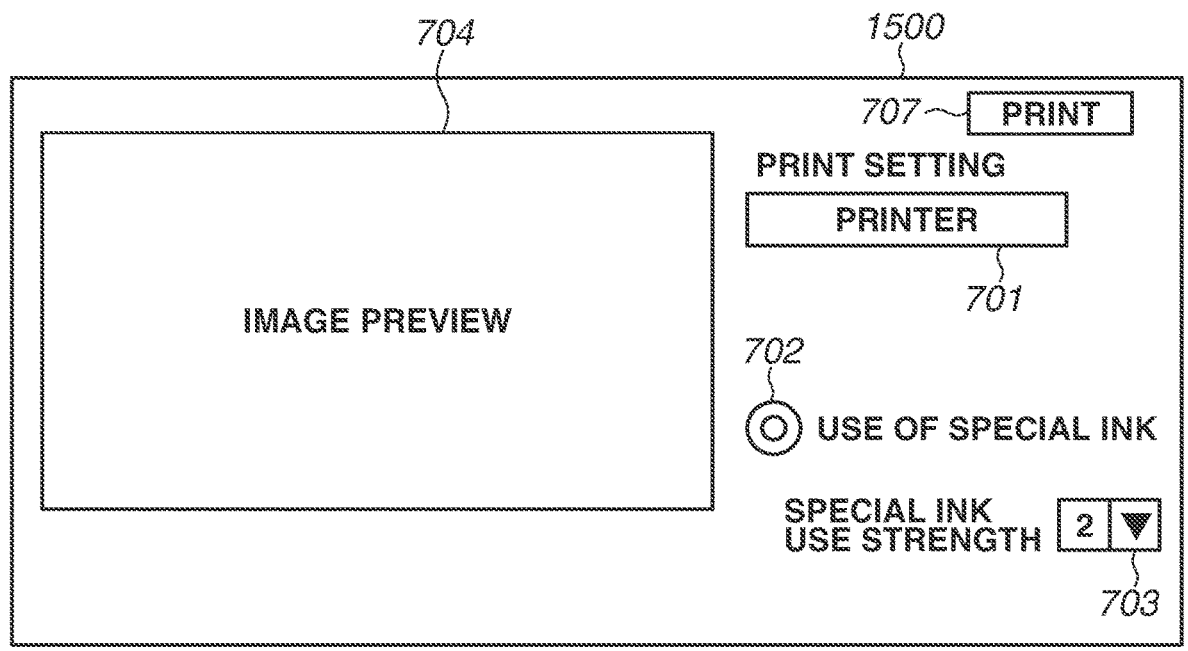
FIGS. 6A and 6B are diagrams illustrating a screen for a printing application and a screen for a web application, respectively.
Figure 6B:
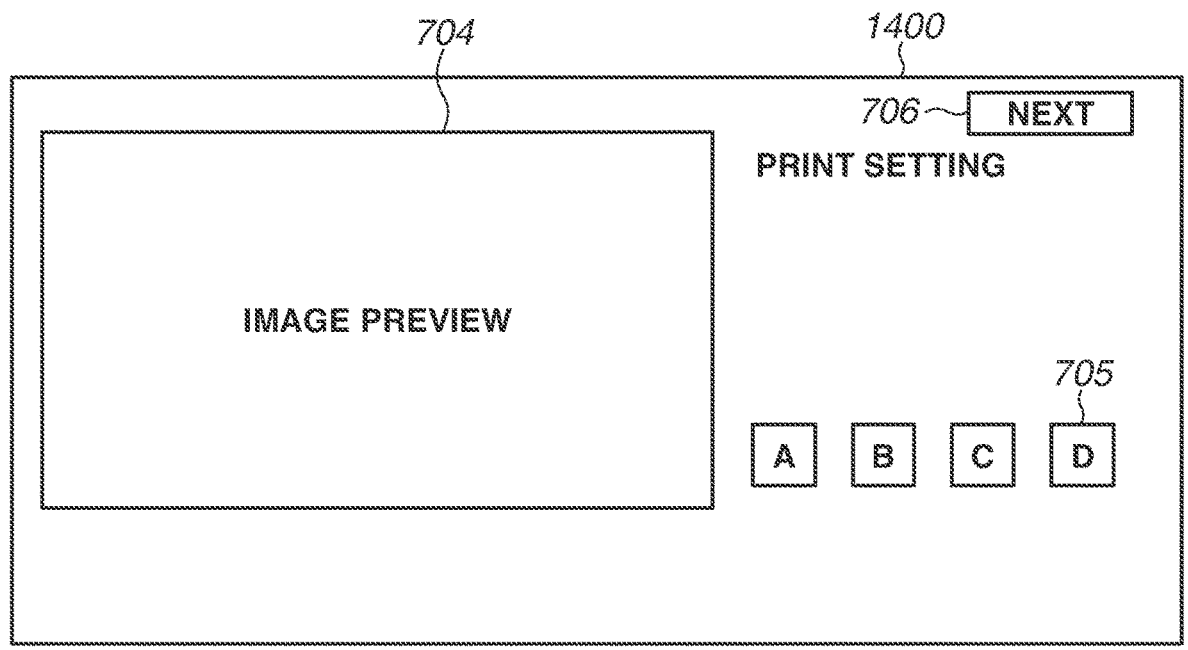

FIGS. 6A and 6B illustrate an example of a screen of the printing application 1500 and an example of a screen of the web application 1400, respectively. As illustrated in FIGS. 6A and 6B, the user performs editing of an image in a region 704 illustrated in FIG. 6B, and performs setting of an image region for which to use special ink in a setting 705. In the setting 705, the user performs selection of a color (any one of color A, color B, color C, and color D) using special ink with respect to the selected image region. Furthermore, although not being displayed, RGB values specific to a color using special ink are assumed to be previously determined with respect to each color using special ink. Then, if the user presses, for example, the "next" button 706 on the screen illustrated in FIG. 6B, the printing application 1500 illustrated in FIG. 6A is invoked. For example, the user sets selection of a printer in a setting 701, sets the presence or absence of use of special ink in a setting 702, and sets the use strength of special ink in a setting 703. Furthermore, setting 701 is a combo box used for receiving the designation of a printer (printer driver) for use in printing from the user. Moreover, the setting 703 is configured with a combo box for "0", "1", "2", and "3", which are examples of setting values and indicate "weakest", "weak", "standard", and "strong", respectively, as the use strengths of special ink. When wishing to designate "standard" as the use strength of special ink, the user selects "2" in the setting 703. Furthermore, the setting values in the setting 703 are not limited to these. Moreover, the user also performs print setting for, for example, a paper type and a paper size (not illustrated) on the screen illustrated in FIG. 6A.

Then, the user presses the "print" button 707 on the screen illustrated in FIG. 6A. In response to the "print" button 707 being pressed, information set on the screen of the printing application 1500 and a creation instruction for image data are transmitted to the server computer 3000. Furthermore, a configuration in which, in FIG. 6B, the setting 702 or the setting 703 is displayed in the screen of the web application 1400 and various setting operations are performed thereon can be employed.

The flowchart of FIG. 5 is started based on, for example, the "print" button 707 of the printing application 1500 being pressed and the server computer 3000 receiving a creation instruction for image data from a terminal retaining the printing application 1500.

In step S601, the CPU 301 performs input image acquisition processing via the input image data acquisition unit 502 illustrated in FIG. 3. Specifically, the CPU 301 acquires input image data D1 out of data received by the data reception processing unit 501 illustrated in FIG. 3. The input image data D1 represents, for example, photographic image data obtained by performing image capturing with an imaging apparatus. Moreover, for example, the input image data D1 represents image data obtained by editing an image with image editing software. Moreover, for example, the input image data D1 represents image data of the HyperText Markup Language (HTML) or Cascading Style Sheets (CSS) format, which is able to be displayed by a browser, vector image data of, for example, the Scalable Vector Graphics (SVG) format, or image data of, for example, the JPEG format. The input image data D1 can be any type of data as long as it is data which is able to be converted into printing image data in rendering processing described below. Furthermore, the CPU 301 stores the acquired image data D1 in the external storage device 304 or the RAM 303.

In step S602, the CPU 301 performs print setting acquisition processing via the print setting data acquisition unit 503 illustrated in FIG. 3. Specifically, the CPU 301 acquires print setting data D2 out of data received by the data reception processing unit 501 illustrated in FIG. 3. The print setting data D2 represents, for example, printer model information, printer paper feed information, a paper size, a paper type, a print quality, and border setting, which have been selected by the user in the setting 701 illustrated in FIG. 6A. Such pieces of print setting data are information related to performing calculation of the rendering size. The information related to performing calculation of the rendering size includes, for example, a printable area size P2. For example, the printable area size P2 varies depending on the printer model, the paper type and paper size set to the printer, such as cut sheet or roll paper, out of paper feed information, and high-quality paper or low-quality paper, such as plain paper, out of paper quality. Moreover, the printable area size P2 varies depending on setting of high image quality or low image quality out of print quality. With regard to border setting, the printable area size P2 varies depending on bordered printing and borderless printing.

Additionally, the CPU 301 acquires setting related to special ink, such as the presence or absence of use of special ink, the use strength of special ink, or the value of a color using special ink, which is set in the print setting data D2.

Furthermore, the CPU 301 stores the acquired print setting data D2 in the external storage device 304 or the RAM 303.

In step S603, the CPU 301 performs rendering processing via the rendering processing unit 504 illustrated in FIG. 3. Specifically, the CPU 301 acquires the acquired input image data D1 and print setting data D2 from the external storage device 304 or the RAM 303. Then, the CPU 301 creates printing image data D3 using the print setting data D2 from the input image data D1. For example, in a case where information indicating setting of bordered printing with A4 paper is included in the acquired print setting data D2, the CPU 301 acquires a print area image size P1 for bordered printing with A4 paper, which is previously retained. Then, as mentioned above, the CPU 301 creates printing image data D3 including image data obtained by performing enlargement/reduction processing on the input image data D1 into the print area image size P1.

In step S604, the CPU 301 determines whether to use special ink, based on the setting related to special ink included in the print setting data D2. For example, in a case where, in the acquired print setting data D2, the "presence of use of special ink" is currently set, the special ink use strength is currently set, or the value of a color using special ink is currently set, the CPU 301 determines to use special ink. On the other hand, in a case where, in the acquired print setting data D2, those settings are not present, the CPU 301 determines not to use special ink. If a result of the determination in step S604 is yes (YES in step S604), the CPU 301 advances the processing to step S605, and, if a result of the determination in step S604 is no (NO in step S604), the CPU 301 advances the processing to step S606.

In step S605, the CPU 301 creates an output image by compression processing in the JPEG format. Specifically, the CPU 301 determines to compress the printing image data D3, for which it has been determined to use special ink, with the Q value "100" using the JPEG format and then performs compression. Furthermore, the compression processing in the JPEG format uses a known technique for lossy compression processing. Generally, lossy compression processing is regarded as being better in compression efficiency than lossless compression processing. Specifically, lossy compression processing allows a lack or alteration of a part of data in the course of compression coding, thus being able to efficiently perform compression. Moreover, even when being decompressed (restored to its original form), lossy-compressed data does not exactly coincide with original data, so that RGB values vary. In the compression processing in the JPEG format, the CPU 301 performs discrete cosine transform (DCT) in units of 8 pixels×8 pixels and performs quantization processing using a Q value. Additionally, the CPU 301 performs coding processing of output values of quantization processing, thus compressing an image.

Furthermore, in the web application 1400, the user is selecting a color (any one of color A, color B, color C, and color D) using a special ink for an image area selected in the setting 705 illustrated in FIG. 6B. At this time, although not being displayed, with regard to a color using special ink, RGB values for the color using special ink are previously determined. For example, suppose that RGB values for a first color using special ink out of colors using special ink are (R, G, B)=(255, 255, 0) and RGB values for a second color using special ink out of colors using special ink are (R, G, B)=(255, 0, 255). Moreover, if, out of image data in a state in which image data subjected to conversion into a compressed file by the printer 4000 has been decompressed (restored to its original form), RGB values of a pixel in which, before compression, the RGB values for the first color have been set are in the range of (R, G, B)=(255, 255, 0) to (255, 255, 16), special ink is used for printing of the corresponding pixel of the image data. However, if the RGB values of that pixel have become values that are out of the above-mentioned range, special ink is assumed not to be used for printing of the corresponding pixel and normal ink is assumed to be used to output a color corresponding to RGB values which are out of the above-mentioned range. In other words, while a pixel of RGB values which are in a specific range is printed with at least special ink being used, a pixel of RGB values which are out of the specific range is printed with special ink not being used and normal ink being used.

For example, suppose that the data size of original image data not yet compressed of a given pixel is 1,000 kilobytes (KB), the data size of image data compressed with the Q value "100" is 500 KB, and the degree of coincidence with the original image data not yet compressed is 99%. In this example, in a case where RGB values of a given pixel of the original image in the case of using special ink are, for example, (R, G, B)=(255, 255, 0), RGB values of the given pixel in a state in which image data compressed with the Q value "100" has been decompressed become, for example, (R, G, B)=(255, 255, 2). This indicates that special ink is used for printing of the given pixel of image data compressed with the Q value "100". On the other hand, suppose that, for example, the data size of original image data not yet compressed of a given pixel is 1,000 KB, the data size of image data compressed with the Q value "70" is 250 KB, and the degree of coincidence with the original image data not yet compressed is 80%. In this example, in a case where RGB values of a given pixel of the original image in the case of using special ink are, for example, (R, G, B)=(255, 0, 0), RGB values of the given pixel in a state in which image data compressed with the Q value "70" has been decompressed become, for example, (R, G, B)=(255, 255, 50). This indicates that special ink is not used for printing of the given pixel of image data compressed with the Q value "70".

Therefore, the CPU 301 compresses the printing image data D3, for which it has been determined to use special ink, with the Q value "100" using the JPEG format.

Moreover, in the data transmission processing unit 506, the CPU 301 transmits print data including an image file and print setting data to the client computer 1000 via the data communication I/F 305. Then, the CPU 101 of the client computer 1000 transmits the print data including an image file and print setting data to the printer 4000 via the data communication I/F 105, so that printing is started. Furthermore, the print data including an image file and print setting data can be transmitted to the mobile terminal 2000 and the CPU 201 can transmit the print data including an image file and print setting data to the printer 4000 via the data communication I/F 205. Moreover, in the data transmission processing unit 506, the CPU 101 or the CPU 201 can directly transmit the print data to the printer 4000.

In step S606, the CPU 301 creates an output image by compression processing in the JPEG format. Specifically, the CPU 301 determines to compress the printing image data D3, for which it has been determined not to use special ink, with the Q value "70" using the JPEG format and then performs compression. With regard to the printing image data D3 for which it has been determined not to use special ink, RGB values in a case where image data subjected to conversion into image file format has been decompressed do not need to fall within the range of RGB values for which special ink is appropriately used. Therefore, the CPU 301 is able to compress the printing image data D3 for which it has been determined not to use special ink, with the Q value "70" using the JPEG format.

This makes the data size of image data compressed with the Q value "70" using the JPEG format smaller than the data size of image data compressed with the Q value "100" using the JPEG format.

Moreover, in the data transmission processing unit 506, the CPU 301 transmits print data including an image file and print setting data to the client computer 1000 via the data communication I/F 305. Then, the CPU 101 of the client computer 1000 transmits the print data including an image file and print setting data to the printer 4000 via the data communication I/F 105, so that printing is started. Furthermore, the print data including an image file and print setting data can be transmitted to the mobile terminal 2000, and the CPU 201 of the mobile terminal 2000 can transmit the print data including an image file and print setting data to the printer 4000 via the data communication I/F 205. Moreover, in the data transmission processing unit 506, the CPU 101 or the CPU 201 can directly transmit the print data to the printer 4000.

As described above, the first exemplary embodiment is configured to change (switch) a compression parameter for performing conversion into image file format depending on the presence or absence of use of special ink for image data. This reduces RGB values from being changed due to image data being compressed and prevents the changed RGB values from becoming RGB values that do not correspond to special ink printing. Therefore, since, in the case of using special ink, compression is performed within a range in which special ink is appropriately used for image data, it is possible to print image data using appropriate special ink. Moreover, since, in the case of not using special ink, compression is performed in such a manner that the file size becomes smaller, it is possible to shorten a data transfer time or a processing time for, for example, file retention. Moreover, the above-mentioned configuration prevents the changed RGB values from becoming RGB values corresponding to special ink other than the special ink designated by the user. As a result, it is possible to appropriately print image data using special ink.

Furthermore, while, in the first exemplary embodiment, compression is performed as a method of reducing the data size of image data, the first exemplary embodiment is not limited to this. The data size of image data can be reduced by not performing compression but reducing the image size, which includes sizes of width and height of the input image data D1, and decreasing the number of pixels (resolution). Moreover, a combination of a method of reducing the data size of image data by performing compression (hereinafter referred to as a "method 1") and a method of reducing the data size of image data by reducing the image size of image data and decreasing the number of pixels (resolution) (hereinafter referred to as a "method 2") can be used. Furthermore, it is assumed that, as the image size of image data is made smaller, the data size of image data becomes smaller. For example, in a case where it has been determined to use special ink for image data and compression has been performed with the Q value "100", to make the data size of image data smaller, the CPU 301 can reduce the image size of image data and decrease the number of pixels (resolution). Thus, both the method 1 and the method 2 can be combined with each other. Furthermore, with regard to the sequential order of the method 1 and the method 2, any one can be performed first. Moreover, the CPU 301 can receive information related to a receiving memory amount from the printer 4000 and determine whether to combine the method 1 with the method 2 based on the receiving memory amount. For example, in a case where the printer 4000 includes an external storage device, such as a hard disk, and using only one of the method 1 and the method 2 prevents the receiving memory amount from exceeding a limit, the CPU 301 can determine not to combine the method 1 and the method 2. On the other hand, in a case where the printer 4000 does not include an external storage device, such as a hard disk, and using only one of the method 1 and the method 2 does not prevent the receiving memory amount from exceeding a limit, the CPU 301 can determine to combine the method 1 and the method 2.

Additionally, the first exemplary embodiment is configured to change a compression parameter in performing conversion into image file format depending on the presence or absence of use of special ink for image data. However, in a case where it has been determined to use special ink, compression processing (processing for reducing the data size of image data) does not need to be performed. Thus, a configuration in which, in a case where it has been determined to use special ink, compression processing is not performed and, in a case where it has been determined not to use special ink, compression processing is performed with the determined compression parameter can be employed. Moreover, it can be determined whether to compress the data size of image data and, in a case where it has been determined not to perform compression, compression processing does not need to be performed. In this case, if it has been determined to perform compression, it can be determined whether to use special ink and compression processing can be performed with a compression parameter determined based on the presence or absence of use of special ink.

Moreover, in the first exemplary embodiment, when performing conversion into an image file format, the server computer 3000 performs processing for determining a compression parameter corresponding to the presence or absence of use of special ink. However, the client computer 1000 or the mobile terminal 2000 can perform such processing. Thus, a configuration in which the client computer 1000 or the mobile terminal 2000 retains a software configuration such as that illustrated in FIG. 3 and is able to execute a flowchart such as that illustrated in FIG. 5 to transmit print setting data to the printer 4000 via another device can be employed. Moreover, a configuration in which the client computer 1000 or the mobile terminal 2000 is able to directly transmit print setting data to the printer 4000 can be employed.

In the first exemplary embodiment, a configuration which changes a compression format or a compression parameter in performing conversion into image file format depending on the presence or absence of use of special ink for image data has been described. Additionally, the configuration performs lossy compression processing for reducing the data size of image data as compression processing. However, while the lossy compression processing is able to efficiently perform compression by allowing a lack or alteration of a part of data in the process of compression coding, if compressed data is decompressed (restored to its original form), the decompressed data may not coincide with the original image data, so that RGB values may vary. Additionally, the image quality of image data may deteriorate. Therefore, a second exemplary embodiment is configured to use lossless compression processing with respect to image data for which special ink is used. This is because, if lossless-compressed data obtained by lossless compression processing is decompressed (restored to its original form), the decompressed data coincides with the original image data, so that RGB values do not vary and the deterioration of the image quality can be reduced. Furthermore, in the case of lossless compression processing, the data size of image data may become larger than in the case of lossy compression processing depending on images. However, for example, a terminal which includes a high-speed CPU and a large-capacity memory as with a PC may be able to perform processing even on an image file with a large data size. Therefore, the second exemplary embodiment described below is configured to determine the type of a terminal which retains a printing application to which the server computer 3000 transmits a created image file. Then, the second exemplary embodiment is configured to perform processing for changing a compression format or a compression parameter with respect to image data for which special ink is used, based on the determined type of the terminal. Furthermore, processing operations similar to those in the first exemplary embodiment are omitted from description.

FIG. 7 is a diagram illustrating a table showing compression forms and compression parameters corresponding to the types of terminals and the presence and absence of use of special ink. Thus, this indicates that, with respect to printing image data D3 generated by the rendering processing unit 504, a compression format and a compression parameter for performing conversion into image file format in the output image creation unit 505 are changed depending on the type of a terminal and the presence or absence of use of special ink.

As a compression format in performing conversion into image file format, the PNG format, which is lossless compression processing, is used in addition to the JPEG format, which is used in the first exemplary embodiment. The data size of image data subjected to conversion into an image file format in the PNG format may be larger than the data size of image data subjected to conversion into an image file format with the Q value "100" in the JPEG format, which is lossy compression processing, depending on images. Moreover, the data size of image data subjected to conversion into image file format in the PNG format is larger than the data size of image data subjected to conversion into image file format with the Q value "70" in the JPEG format. Moreover, in a case where conversion into an image file format has been performed in the PNG format, if the lossless-compressed data is decompressed (restored to its original form), the decompressed data coincides with the original image data, so that RGB values do not vary.

The second exemplary embodiment is characterized by switching a compression parameter depending on the type of a terminal which is used to operate the printing application 1500 and the presence or absence of use of special ink. The type of a terminal which is able to operate (retains) the printing application 1500 includes a PC terminal, such as the client computer 1000, which retains, for example, Windows® or macOS®.

Moreover, the type of such a terminal includes the mobile terminal 2000, which retains, for example, iOS or Android OS. Furthermore, the printing application 1500 which is installed on the client computer 1000 and the printing application 1500 which is installed on the mobile terminal 2000 can be separate programs different in part of functions thereof or can be the same program.

In a case where an instruction for printing using special ink is issued from the printing application 1500 of the mobile terminal 2000, the printing image data D3 is compressed with the Q value "100", which is a compression parameter in the JPEG format. Moreover, in a case where an instruction for printing not using special ink is issued from the printing application 1500 of the mobile terminal 2000, the printing image data D3 is compressed with the Q value "70", which is a compression parameter in the JPEG format.

Generally, the client computer 1000 is larger in the capacity of a CPU and memory and is able to perform higher-speed processing than the mobile terminal 2000. Therefore, in a case where an instruction for printing using special ink is issued from the printing application 1500 of a PC terminal, compression processing in the PNG format, which is lossless compression processing, is performed on the printing image data D3. Moreover, in a case where an instruction for printing not using special ink is issued from the printing application 1500 of a PC terminal, the printing image data D3 is compressed with the Q value "70", which is a compression parameter in the JPEG format.

As mentioned above, as the Q value is smaller, RGB values set in the input image data change to a greater extent. Therefore, in the case of using special ink for image data, for the purpose of reducing the amount of change of RGB values, the Q value is made larger than in the case of not using special ink for image data.

Furthermore, in the case of the PNG format, RGB values of image data are not changed. Thus, it is previously assumed that appropriate special ink is able to be used for image data. Furthermore, a compression format other than the PNG format can be used as long as it is lossless compression processing. Furthermore, such another compression format only needs to be a compression format capable of creating compressed data with the amount of change of RGB values smaller than that in a case where conversion into image file format is performed in the JPEG format. Moreover, the data size of image data compressed in such another compression format can be configured to be larger than the data size of image data subjected to conversion into image file format with the Q value "100" or Q value "70" in the JPEG format, which is lossy compression processing.

Figure 8:
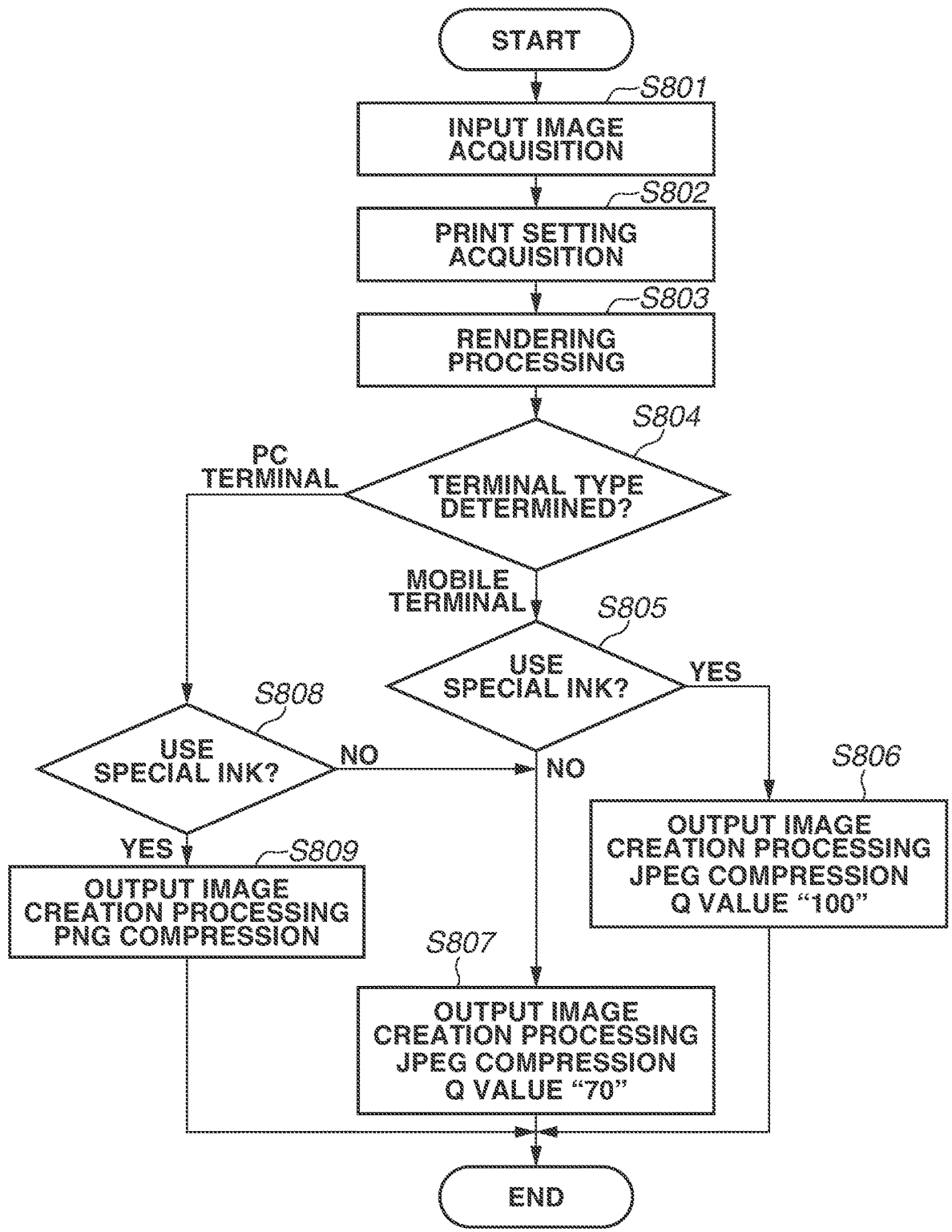
FIG. 8 is a flowchart illustrating processing for determining a compression format and a compression parameter corresponding to a type of terminal and the presence or absence of use of special ink in performing conversion into image file format.

Furthermore, the Q values for use in the respective cases are not limited to those illustrated in FIG. 7. The Q value which is used in the case of using special ink for image data can be any value as long as it is a Q value in which it is previously assumed that, even if RGB values of an image are changed, the changed RGB values fall within an appropriate usage range. Moreover, the Q value which is used in the case of not using special ink for image data can be any value as long as it is a value smaller than the Q value which is used in the case of using special ink for image data. FIG. 8 is a flowchart illustrating processing for determining a compression format and a compression parameter corresponding to the type of a terminal and the presence or absence of use of special ink and performing compression. Processing operations in the respective steps in the flowchart of FIG. 8 are implemented by the CPU 301 of the server computer 3000 reading out and executing a program related to processing in a flowchart.

Processing operations in steps S801 to S803 are similar to those in steps S601 to S603 and are, therefore, omitted from description. Furthermore, in step S801 or S802, the CPU 301 acquires information indicating which, of a mobile terminal and a PC terminal, the type of a terminal which retains the printing application 1500 serving as a transmission source of print setting data and an image file creation instruction is.

In step S804, the CPU 301 determines the type of a terminal based on the information indicating which of a mobile terminal and a PC terminal the type of a terminal which retains the printing application 1500 serving as a transmission source of print setting data and an image file creation instruction is, which has been acquired in step S801 or S802. Furthermore, a printing application to which the server computer 3000 transmits a created image file is the printing application 1500 serving as a transmission source of print setting data and an image file creation instruction. If, in step S804, it is determined that the terminal type is a mobile terminal (MOBILE TERMINAL in step S804), the CPU 301 advances the processing to step S805, and, if, in step S804, it is determined that the terminal type is a PC terminal (PC TERMINAL in step S804), the CPU 301 advances the processing to step S808.

Processing operations in steps S805 to S807 are similar to those in steps S604 to S606 and are, therefore, omitted from description.

A processing operation in step S808 is similar to that in step S604 and is, therefore, omitted from description. Furthermore, if a result of the determination in step S808 is yes (YES in step S808), the CPU 301 advances the processing to step S809, and, if a result of the determination in step S808 is no (NO in step S808), the CPU 301 advances the processing to step S807.

In step S809, the CPU 301 performs creation of an output image by compression processing in the PNG format. Specifically, the CPU 301 determines to perform compression using the PNG format on the printing image data D3 for which it has been determined to use special ink, and then performs such compression. Furthermore, the compression processing in the PNG format uses a known technique for lossless compression processing.

Moreover, in the data transmission processing unit 506, the CPU 301 transmits print data including an image file and print setting data to the client computer 1000 or the mobile terminal 2000 via the data communication I/F 305. Then, the CPU 101 of the client computer 1000 or the CPU 201 of the mobile terminal 2000 transmits the print data including an image file and print setting data to the printer 4000 via the data communication I/F 105 or the data communication I/F 205, so that printing is started.

As described above, the second exemplary embodiment is configured to change (switch) a compression format and a compression parameter with respect to image data for which special ink is used, depending on a terminal which retains a printing application to which the server computer 3000 transmits a created image file. For example, since a terminal which retains a high-speed CPU and a high-capacity memory, such as a PC, is able to process even an image file with a large data size, the second exemplary embodiment is configured to use lossless compression processing, in which, in a case where compressed data is decompressed (restored to its original form), the decompressed data coincides with the original image data, so that RGB values do not vary. This enables performing compression processing corresponding to the performance of a terminal even in different terminal environments, so that it is possible to perform appropriate printing using special ink with respect to image data for which special ink is used. Moreover, using lossless compression processing enables a reduction in the deterioration of image quality.

In the above-described second exemplary embodiment, when performing conversion into image file format, the server computer 3000 determines a compression format and a compression parameter corresponding to the type of a terminal and the presence or absence of use of special ink and then performs compression. In a third exemplary embodiment, a configuration in which the printing application 1500 determines a compression format and a compression parameter corresponding to the type of a terminal and the presence or absence of use of special ink and, then, the server computer 3000 performs compression based on an instruction received from the printing application 1500 is described.

Figure 9:
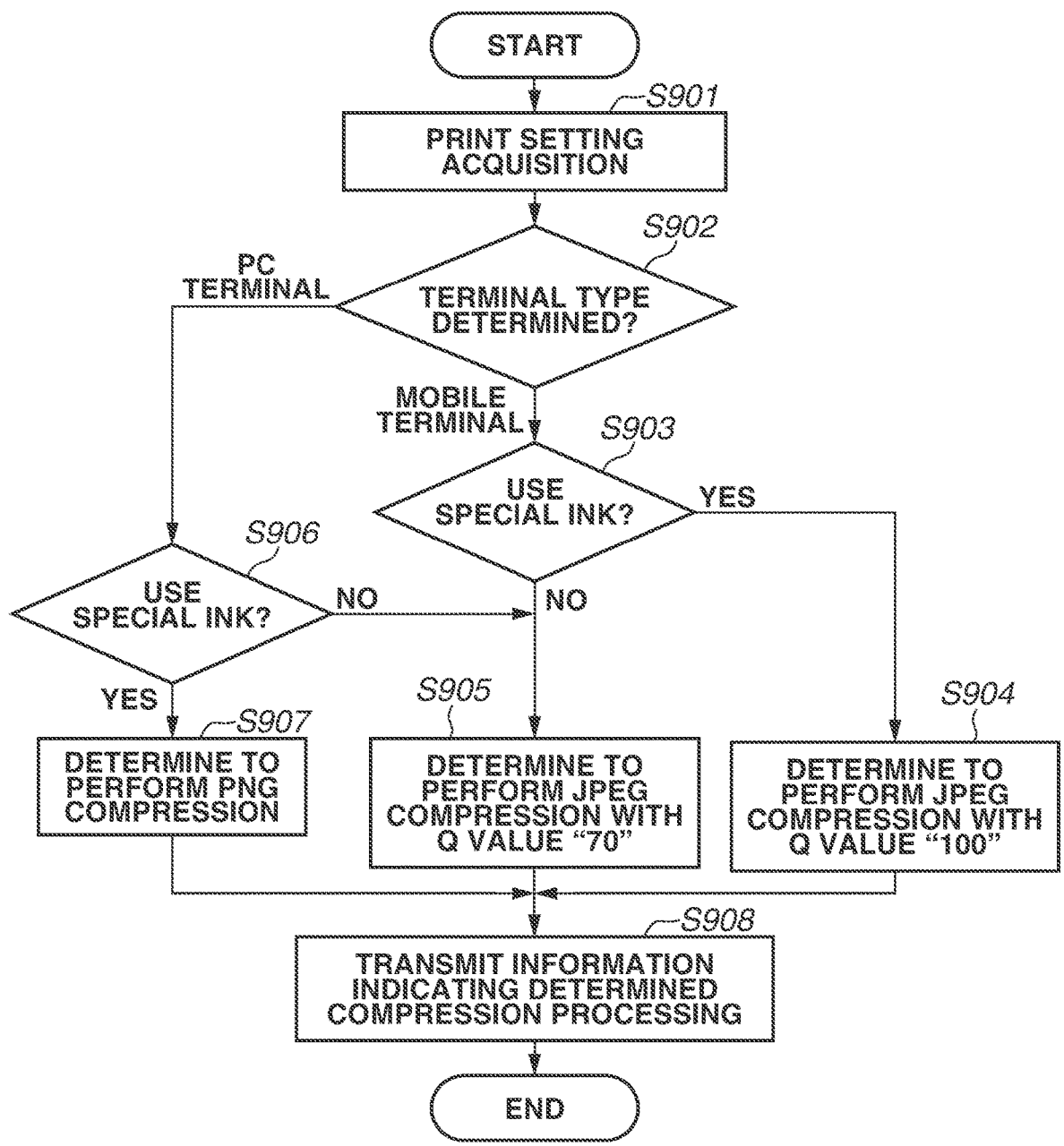
FIG. 9 is a flowchart illustrating processing in which the printing application determines a compression format and a compression parameter corresponding to a type of terminal and the presence or absence of use of special ink.

FIG. 9 is a flowchart illustrating processing which the printing application 1500 performs to determine a compression format and a compression parameter corresponding to the type of a terminal and the presence or absence of use of special ink. In FIG. 9, processing is described with the printing application 1500 set as the subject which performs each processing operation. However, actually, a corresponding function is implemented by the CPU 101 included in the client computer 1000 or the CPU 201 included in the mobile terminal 2000 executing a corresponding program. Furthermore, not all of the processing operations are necessarily sequentially performed on a single process, and there can be a case where processing proceeds to an OS once and the processing is invoked from the OS again. FIG. 9 illustrates only principal processing operations for descriptive purposes and in an easily understood manner.

A processing operation in step S901 is similar to that in step S602 and is, therefore, omitted from description. Furthermore, the printing application 1500 can be configured to create information related to rendering processing based on the acquired print setting information and transmits a print instruction to the server computer 3000.

In step S902, the printing application 1500 determines a terminal which retains the printing application 1500 and thus determines which of a PC terminal and a mobile terminal the determined terminal is. For example, the printing application 1500 previously acquires system information about a terminal when the printing application 1500 has been installed on the terminal. Alternatively, the printing application 1500 previously acquires system information about the terminal when being invoked. The system information about a terminal contains, for example, information about the type of an OS of the terminal and information about the type of the terminal. The printing application 1500 determines which of a PC terminal and a mobile terminal a terminal retaining the printing application 1500 is, based on any information capable of identifying the type of the terminal included in the system information about the terminal. If, in step S902, it is determined that the terminal is a mobile terminal (MOBILE TERMINAL in step S902), the printing application 1500 advances the processing to step S903, and, if, in step S902, it is determined that the terminal is a PC terminal (PC TERMINAL in step S902), the printing application 1500 advances the processing to step S906.

A processing operation in step S903 by the printing application 1500 is similar to that in step S604 and is, therefore, omitted from description. If a result of the determination in step S903 is yes (YES in step S903), the printing application 1500 advances the processing to step S904, and, if a result of the determination in step S903 is no (NO in step S903), the printing application 1500 advances the processing to step S905.

In step S904, the printing application 1500 determines to compress the printing image data D3, for which it has been determined to use special ink, with the Q value "100" using the JPEG format to create an output image.

In step S905, the printing application 1500 determines to compress the printing image data D3, for which it has been determined not to use special ink, with the Q value "70" using the JPEG format to create an output image.

A processing operation in step S906 by the printing application 1500 is similar to that in step S604 and is, therefore, omitted from description. If a result of the determination in step S906 is yes (YES in step S906), the printing application 1500 advances the processing to step S907, and, if a result of the determination in step S906 is no (NO in step S906), the printing application 1500 advances the processing to step S905.

In step S907, the printing application 1500 determines to compress the printing image data D3, for which it has been determined to use special ink, using the PNG format to create an output image.

In step S908, the printing application 1500 transmits method information about compression processing of the printing image data D3 (a compression format and a compression parameter) determined depending on the type of the terminal and the presence or absence of use of special ink and a compression instruction to the server computer 3000 outside the terminal. Moreover, the printing application 1500 transmits print setting data and an image file creation instruction. Additionally, when having created information related to rendering processing based on the print setting information acquired in step S901, the printing application 1500 can transmit the information related to rendering processing to the server computer 3000. Specifically, the printing application 1500 can be configured to calculate the printable area size P2 from the print setting information and transmit the calculated printable area size P2 to the server computer 3000.

Figure 10:
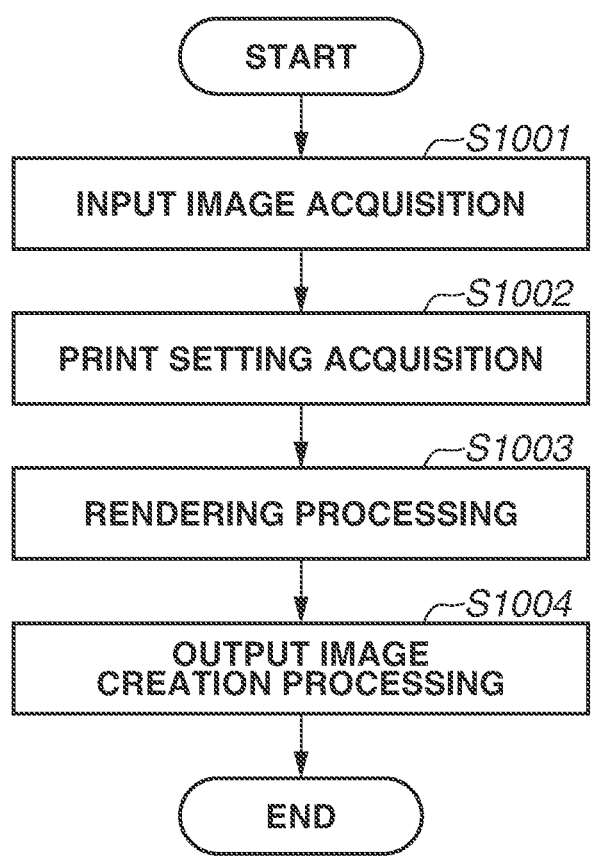
FIG. 10 is a flowchart illustrating processing in which a server computer performs compression processing using a compression format and a compression parameter corresponding to a type of terminal and the presence or absence of use of special ink.

FIG. 10 is a flowchart illustrating compression processing which the server computer 3000 performs using a compression format and a compression parameter corresponding to the type of a terminal and the presence or absence of use of special ink.

Processing operations in steps S1001 to S1003 by the CPU 301 are similar to those in steps S601 to S603 and are, therefore, omitted from description. Furthermore, in step S1002, the CPU 301 acquires method information about compression processing of the printing image data D3 (a compression format and a compression parameter) determined depending on the type of a terminal and the presence or absence of use of special ink and a compression instruction. Moreover, in a case where information related to rendering processing has been transmitted, the CPU 301 also acquires the information related to rendering processing. Specifically, the server computer 3000 acquires the printable area size P2. Furthermore, in a case where information related to rendering processing has been transmitted, the server computer 3000 does not need to acquire information related to calculation of the printable area size P2 included in the print setting.

In step S1004, the CPU 301 compresses the printing image data D3 based on a compression format and a compression parameter determined depending on the type of the terminal and the presence or absence of use of special ink, which have been acquired in step S1002. For example, in a case where information related to performing compression with the Q value "70" in the JPEG format is included in the compression instruction, the CPU 301 compresses the printing image data D3 with the Q value "70" using the JPEG format, thus creating an output image. Moreover, for example, in a case where information related to performing compression with the Q value "100" in the JPEG format is included in the compression instruction, the CPU 301 compresses the printing image data D3 with the Q value "100" using the JPEG format, thus creating an output image. Additionally, in a case where information related to performing compression using the PNG format is included in the compression instruction, the CPU 301 compresses the printing image data D3 using the PNG format, thus creating an output image.

Moreover, in the data transmission processing unit 506, the CPU 301 transmits print data including an image file and print setting data to the client computer 1000 or the mobile terminal 2000 via the data communication I/F 305. Then, the CPU 101 of the client computer 1000 or the CPU 201 of the mobile terminal 2000 transmits the print data including an image file and print setting data to the printer 4000 via the data communication I/F 105 or the data communication I/F 205, so that printing is started.

As described above, in the third exemplary embodiment, the printing application 1500 determines a compression format and a compression parameter corresponding to the type of a terminal and the presence or absence of use of special ink and, then, the server computer 3000 performs compression based on an instruction received from the printing application 1500. This enables performing compression processing corresponding to the performance of a terminal even in different terminal environments, so that it is possible to perform appropriate printing using special ink with respect to image data for which special ink is used. Moreover, using lossless compression processing enables reducing the deterioration of image quality.

Furthermore, in the third exemplary embodiment, in FIG. 9, the printing application 1500 determines which of a PC terminal and a mobile terminal the terminal retaining the printing application 1500 is. However, in a case where the printing application 1500 has an awareness that the printing application 1500 is a printing application for a PC terminal or a printing application for a mobile terminal, the printing application 1500 does not need to perform the determination in step S902. Thus, in a case where the printing application 1500 has an awareness that the printing application 1500 is a printing application for a PC terminal, the printing application 1500 can perform the determination in step S906 after processing in step S901 and then perform subsequent processing according to the content of the determination. Moreover, in a case where the printing application 1500 has an awareness that the printing application 1500 is a printing application for a mobile terminal, the printing application 1500 can perform the determination in step S903 after processing in step S901 and then perform subsequent processing according to the content of the determination.

The second exemplary embodiment and the third exemplary embodiment are configured to change a compression format and a compression parameter with respect to image data for which special ink is used, depending on a terminal retaining the printing application 1500, to which the server computer 3000 transmits a created image file. However, the second exemplary embodiment and the third exemplary embodiment are not limited to this. For example, another exemplary embodiment can change a compression format and a compression parameter with respect to image data for which special ink is used, depending on a combination of items of the print setting. For example, another exemplary embodiment can change a compression format and a compression parameter depending on model information about a printer, information about paper type, size information about paper, quality information about printing, and image quality information.

In the case of changing a compression format and a compression parameter depending on the model information about a printer, another exemplary embodiment can change a compression format and a compression parameter based on types such as a large format printer and a small format printer. An assumable print processing time differs between a large format printer and a small format printer. For example, a large format printer may require much time for print processing. Therefore, in the case of performing image processing while performing printing, since there is no problem even if image processing takes time, although the data size of image data is large and image processing requires much time, another exemplary embodiment can use a format of lossless compression processing with less deterioration.

Moreover, in the case of changing a compression format and a compression parameter depending on information about paper type, another exemplary embodiment can change a compression format and a compression parameter depending on a high image quality medium and a low image quality medium. For example, in the case of a high image quality medium, since a printed result with a higher image quality is requested, another exemplary embodiment can use a format of lossless compression processing with less deterioration in the case of using special ink.

Moreover, another exemplary embodiment can change a compression format and a compression parameter depending on size information about paper. For example, in a case where the paper size is A0 size (841 mm×1,189 mm), that paper size is larger in size than A4 size or L size (89 mm×127 mm).

In the case of such large-size paper, image processing requires time. Therefore, another exemplary embodiment can use a format of lossy compression processing in which the data size of image data becomes smaller within a range in which special ink is appropriately used.

Moreover, in the case of changing a compression format and a compression parameter depending on quality information about printing, another exemplary embodiment can change a compression format and a compression parameter depending on which of a high quality setting and a low quality setting the quality mode is. In the case of a high quality setting, since a printed result with a higher image quality is requested, another exemplary embodiment can use a format of lossless compression processing with less deterioration in the case of using special ink.

Moreover, another exemplary embodiment can change a compression format and a compression parameter depending on image quality information. For example, there are assumed to be a normal image quality mode and a highest image quality mode. In a case where the normal image quality mode is currently set, another exemplary embodiment changes a compression format and a compression parameter with respect to image data for which special ink is used, depending on the presence or absence of use of special ink. However, in a case where the highest image quality mode is currently set, regardless of a result of a determination of the presence or absence of use of special ink, compression processing using the Q value "100" in the JPEG format or compression processing using the PNG format, which enables performing printing with high image quality, can be performed.

In this way, another exemplary embodiment can change a compression format and a compression parameter depending on a combination of items of the print setting in addition to the presence or absence of use of special ink. Additionally, another exemplary embodiment can change a compression format and a compression parameter with respect to image data for which special ink is used, depending on a terminal which retains the printing application 1500, and, moreover, can change a compression format and a compression parameter depending on a combination of items of the print setting.

Furthermore, the above-described exemplary embodiments are merely configuration examples for attaining the advantageous effects of the present disclosure, and cases in which equivalent advantageous effects are able to be obtained with use of similar different methods or different parameters are also included in the scope of some embodiments. Moreover, the present disclosure can be applied to a system configured with a plurality of apparatuses (e.g., a host computer, an interface device, a reader, and a printer) and an apparatus configured with a single device (e.g., a printer, a copying machine, or a facsimile apparatus).

Moreover, while, in the above-described exemplary embodiments, processing operations in the exemplary embodiments are implemented by a printing application, a browser, and a program running on a server computer operating in cooperation with each other, the exemplary embodiments are not limited to this. For example, suppose that a single application obtained by integrating a printing application, a browser, and a program running on a server computer (hereinafter referred to as an "integrated application") is present on a client computer. In this case, processing operations in the above-described exemplary embodiments can be performed by the CPU 101 of the client computer executing the integrated application. Moreover, in a case where the integrated application is present on a mobile terminal, processing operations in the above-described exemplary embodiments can be performed by the CPU 201 of the mobile terminal executing the integrated application.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-124182, which was filed Jul. 29, 2021 and which is hereby incorporated by reference herein in its entirety.

What is claimed is:

1. A method comprising:
   acquiring print setting information related to printing of image data; and
   in a case where the print setting information specifies that the image data is to be printed using at least special ink, which is ink other than ink for a process color, determining a first compression format as compression processing which is processing for reducing a data size of the image data and,
   in a case where the print setting information specifies that the image data is to be printed using ink for the process color without using the special ink, determining a second compression format different from the first compression format as the compression processing,
   wherein, if red, green, and blue (RGB) values of a pixel, in which RGB values for a color using the special ink have been set in image data obtained by decompressing the image data, are within a range of RGB values for which the special ink is used, the special ink is used for printing of the pixel of the image data, and, if RGB values of a pixel, in which RGB values for a color using the special ink have been set in image data obtained by decompressing the image data, are out of the range of RGB values for which the special ink is used, the special ink is not used for printing of the pixel of the image data.

2. The method according to claim 1, wherein the process color is one color out of cyan, magenta, yellow, and black or a color expressed by a combination of two or more colors out of cyan, magenta, yellow, and black.

3. The method according to claim 1,
   wherein the compression processing includes compression processing using a compression format including the first compression format and the second compression format, and compression processing using a compression strength, and
   wherein processing using at least one of the compression processing using the compression format and the compression processing using the compression strength is performed.

4. The method according to claim 3, wherein image data subjected to the compression processing is transmitted to a printing apparatus which performs printing of the image data, and the image data decompressed in the printing apparatus is printed.

5. The method according to claim 4, wherein which of processing using one method and processing using a plurality of methods is performed as the processing for reducing the data size of the image data is determined based on a receiving memory amount of the printing apparatus.

6. The method according to claim 4, wherein
   in a case where the printing apparatus includes an external storage device, the processing for reducing the data size of the image data uses any one of the compression processing and processing for reducing an image size of the image data with respect to the image data; and in a case where the printing apparatus does not include any external storage device, the processing for reducing the data size of the image data uses both the compression processing and the processing for reducing the image size of the image data with respect to the image data.

7. The method according to claim 3, further comprising:
in a case where the compression processing is the compression processing using the compression strength, processing for further reducing the data size of the image data by performing processing for reducing an image size of the image data with respect to the image data subjected to the compression processing using a compression strength.

8. The method according to claim 3, wherein
in a case where a personal computer (PC) terminal performs the compression processing, the compression processing using the compression format is performed; and
in a case where a mobile terminal performs the compression processing, the compression processing using the compression strength is performed.

9. The method according to claim 8, wherein, in a case where the mobile terminal performs the compression processing,
the compression processing is performed using the first compression strength, in a case where the print setting information specifies that the image data is to be printed using the special ink, and
the compression processing is performed using the second compression strength which is different from the first compression strength, in a case where the print setting information specifies that the image data is to be printed using the ink for the process color.

10. The method according to claim 1, wherein
the first compression format is a format for performing lossless compression processing and the second compression format is a format for performing lossy compression processing.

11. The method according to claim 10, wherein the lossless compression processing is a compression format in which red, green, and blue (RGB) values set to the image data coincide with RGB values obtained in a case where the processing for reducing the data size of the image data has been performed and, then, the image data has been decompressed.

12. The method according to claim 10, wherein the lossless compression processing is a Portable Network Graphics (PNG) format and is processing for generating data in the PNG format.

13. The method according to claim 10, wherein the lossy compression processing is a compression format in which red, green, and blue (RGB) values set to the image data do not coincide with RGB values obtained in a case where the processing for reducing the data size of the image data has been performed and, then, the image data has been decompressed.

14. The method according to claim 10, wherein the lossy compression processing is a Joint Photographic Experts Group (JPEG) format and is processing for generating data in the JPEG format.

15. The method according to claim 1, wherein the image data is printing image data created for printing based on information related to a data size of image data input by a user and information related to a printable area with respect to paper included in the print setting information.

16. The method according to claim 1, wherein a data size of the image data subjected to the compression processing using the first compression format is larger than a data size of the image data subjected to the compression processing using the second compression format.

17. The method according to claim 1, further comprising performing the compression processing based on the determination of the first compression format or the second compression format depending on the print setting information.

18. The method according to claim 1, further comprising:
transmitting the print setting information and processing information indicating the determined compression processing to a server, and
wherein the compression processing is performed by the server depending on the compression processing corresponding to the processing information.

19. The method according to claim 1, further comprising performing the compression processing based on the determined compression processing.

20. A method comprising:
acquiring print setting information related to printing of image data; and
in a case where the print setting information specifies that the image data is to be printed using at least special ink, which is ink other than ink for a process color, determining not to perform compression processing which is processing for reducing a data size of the image data and,
in a case where the print setting information specifies that the image data is to be printed using ink for the process color without using the special ink, determining to perform the compression processing,
wherein, if red, green, and blue (RGB) values of a pixel, in which RGB values for a color using the special ink have been set in image data obtained by decompressing the image data, are within a range of RGB values for which the special ink is used, the special ink is used for printing of the pixel of the image data, and, if RGB values of a pixel, in which RGB values for a color using the special ink have been set in image data obtained by decompressing the image data, are out of the range of RGB values for which the special ink is used, the special ink is not used for printing of the pixel of the image data.

21. A non-transitory computer-readable storage medium storing a program that, when executed, causes a computer to perform a method comprising:
acquiring print setting information related to printing of image data; and
in a case where the print setting information specifies that the image data is to be printed using at least special ink, which is ink other than ink for a process color, determining a first compression format as compression processing which is processing for reducing a data size of the image data and,
in a case where the print setting information specifies that the image data is to be printed using ink for the process color without using the special ink, determining a second compression format different from the first compression format as the compression processing,
wherein, if red, green, and blue (RGB) values of a pixel, in which RGB values for a color using the special ink have been set in image data obtained by decompressing the image data, are within a range of RGB values for which the special ink is used, the special ink is used for printing of the pixel of the image data, and, if RGB values of a pixel, in which RGB values for a color using the special ink have been set in image data obtained by decompressing the image data, are out of the range of RGB values for which the special ink is used, the special ink is not used for printing of the pixel of the image data.

22. An information processing apparatus comprising:

one or more processors and one or more memories that cooperate to:

acquire print setting information related to printing of image data; and in a case where the print setting information specifies that the image data is to be printed using at least special ink, which is ink other than ink for a process color, determine a first compression format as compression processing which is processing for reducing a data size of the image data and, in a case where the print setting information specifies that the image data is to be printed using ink for the process color without using the special ink, determine a second compression format different from the first compression format as the compression processing, wherein, if red, green, and blue (RGB) values of a pixel, in which RGB values for a color using the special ink have been set in image data obtained by decompressing the image data, are within a range of RGB values for which the special ink is used, the special ink is used for printing of the pixel of the image data, and, if RGB values of a pixel, in which RGB values for a color using the special ink have been set in image data obtained by decompressing the image data, are out of the range of RGB values for which the special ink is used, the special ink is not used for printing of the pixel of the image data.

* * * * *